United States Patent

Rosencranz

[15] 3,704,950

[45] Dec. 5, 1972

[54] ELECTRICAL SYSTEM FOR USE IN OPTICAL DENSITOMETRY

[72] Inventor: Robert Rosencranz, Highland Park, Ill.

[73] Assignee: Sargent-Welch Scientific Company, Skokie, Ill.

[22] Filed: Feb. 22, 1971

[21] Appl. No.: 117,541

[52] U.S. Cl. .......................356/73, 356/96, 356/202, 356/209, 356/223, 356/226
[51] Int. Cl. .........G01n 21/00, G01j 3/42, G01j 1/44
[58] Field of Search..........356/72, 73, 201, 204, 206, 356/223, 224, 226, 229, 96, 97, 202, 209; 324/115, 140

[56] References Cited

UNITED STATES PATENTS

| | | | |
|---|---|---|---|
| 2,406,716 | 8/1946 | Sweet | 356/226 X |
| 3,514,700 | 5/1970 | Kalin et al. | 324/140 D |
| 3,525,869 | 8/1970 | Gubisch | 356/201 X |
| 3,544,225 | 12/1970 | Wattenburg et al. | 356/201 |
| 3,377,467 | 4/1968 | Staunton et al. | 356/201 X |
| 3,443,089 | 5/1969 | Sundstrom | 356/73 X |
| 3,446,972 | 5/1969 | Bentley et al. | 356/229 X |
| 3,582,659 | 6/1971 | Dekker | 356/224 X |
| 2,885,926 | 5/1959 | Molloy | 356/226 X |
| 2,891,438 | 6/1959 | Fuhrmann et al. | 356/201 |
| 3,067,649 | 12/1962 | Szymczak | 356/226 X |

*Primary Examiner*—Ronald L. Wibert
*Assistant Examiner*—V. P. McGraw
*Attorney*—Greist, Lockwood, Greenawalt & Dewey

[57] ABSTRACT

An electrical system for use in optical densitometry. The system includes a plurality of separately operable electrical circuits contained in a single unit, and each circuit is adapted to produce response characteristics in a single voltmeter or other associated readable instrument which characterize one selected property or characteristic of the specimen being analyzed. In use, with the electrical system operatively associated with a photometer and a voltmeter or the like, the user, by merely manipulating a single control, may select a circuit which will produce a readable signal indicative of the characteristic he wishes to measure, and such indication or measurement may then be read directly from the voltmeter, for example, while moving the switch to other positions will select other circuits and cause the voltmeter reading to indicate measurements of other characteristics of the same sample. All these operations may be carried out without the necessity of changing the sample, the photometer, the connections thereto, or the character of the voltmeter or other instrument providing the reading. The characteristics typically able to be read include (a) percent dot area of a half tone specimen, (b) the percent of light transmitted through or reflected from the specimen, and (c) the optical density of the specimen. The electrical circuits are arranged so that the signal furnished to the meter for indicating percent dot area is inversely proportional to the strength of the incident light, so that for indicating light transmission percentage, the signal furnished to the meter is directly proportional to the strength of the incident light, and so that for indicating optical density, the signal furnished to the meter is inversely proportional to the logarithm of the strength of the incident light.

8 Claims, 5 Drawing Figures

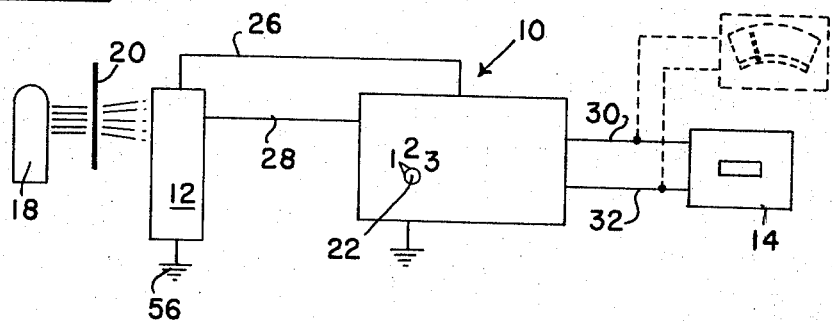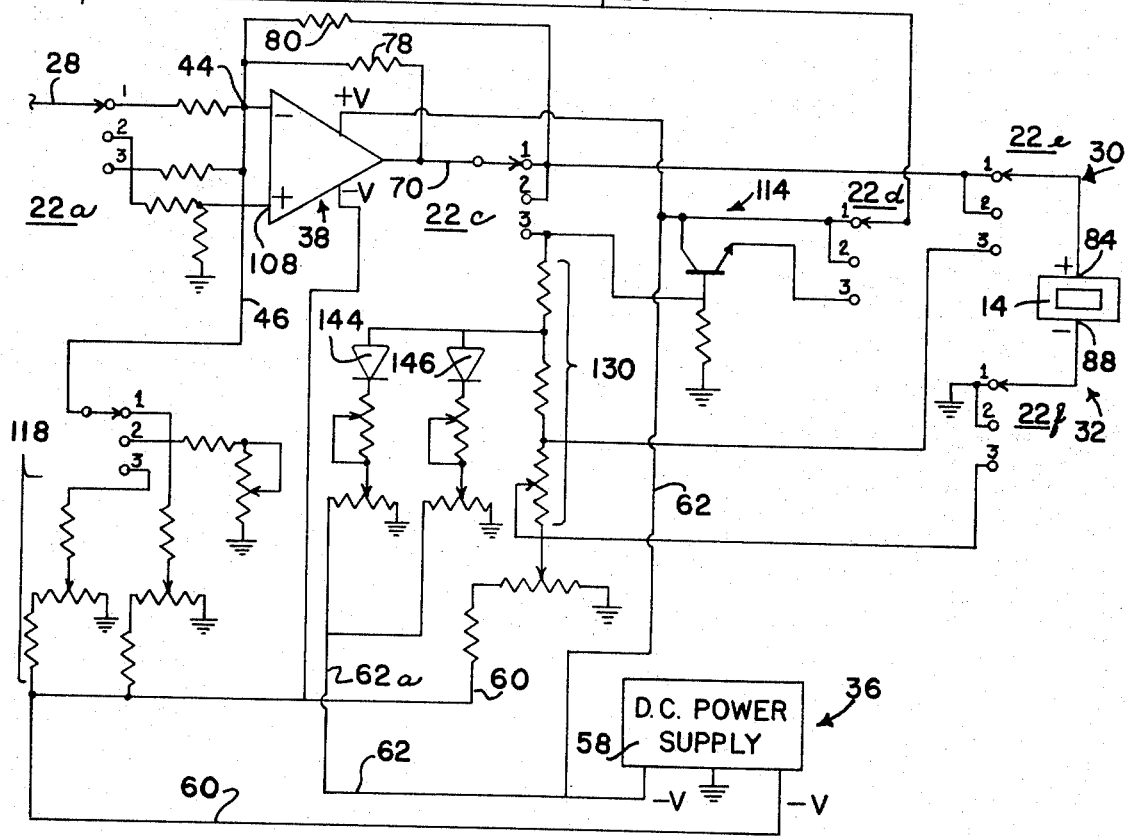

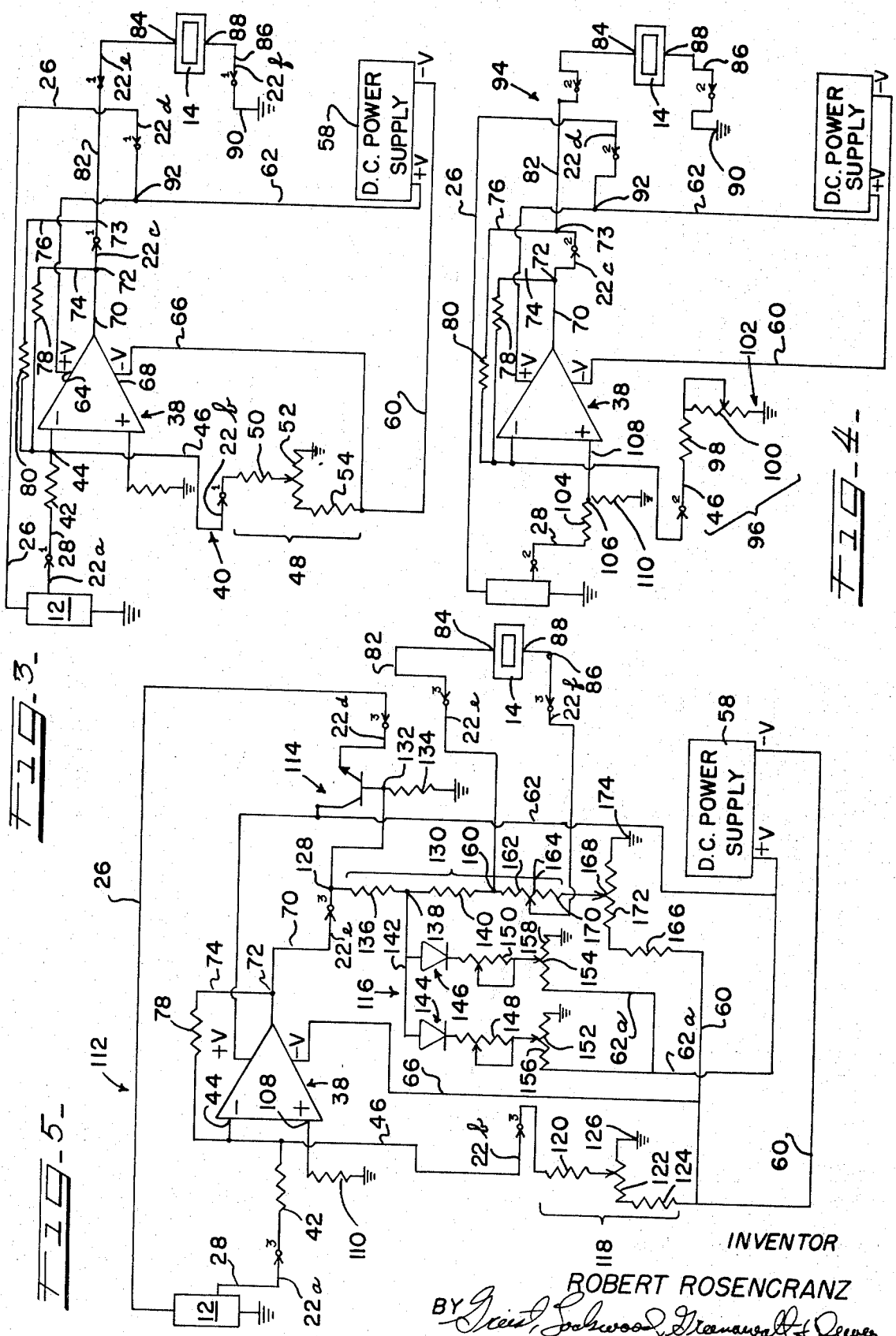

ELECTRICAL SYSTEM FOR USE IN OPTICAL DENSITOMETRY

BACKGROUND OF THE INVENTION

The present invention relates generally to an electrical apparatus, and more particularly to an electrical system for use in optical densitometry. In a preferred embodiment, the system is adapted to receive an input signal from a photometer which is energized by reflected or transmitted light, and to supply to a voltmeter or other readable instrument an output signal bearing a predetermined relation to the input signal. The system includes a plurality of separate but interrelated electrical circuits which may be selectively used to obtain a reading which is indicative of a particular characteristic of the sample or specimen, for example, the so-called percent dot area of a half tone specimen, the percent of light transmitted through or reflected from the specimen, or the optical density of the specimen.

An important feature of the invention is that, in order to obtain the desired measurements of these characteristics, the operator need do nothing but manipulate a selector switch among different positions, with no changes being required in treatment of the specimen, the movement direction of the instrument or the like. For example, assuming that a specimen is placed in a desired position so as to be exposed to a light source, and assuming that a digital or deflection type voltmeter is being used to obtain readings, manipulation of the selector switch will cause the instrument to read percent dot area of the specimen, percent of light transmission through or reflection from the specimen and optical density of the specimen, respectively. The circuits within the electrical unit are so arranged as to take into account the fact that the percent dot area of a half tone specimen bears an inverse relation to the amount of light reflected therefrom and accordingly falling on the photomultiplier; the percent of light transmitted through or reflected from a specimen bears a direct relation to the amount of light incident on the photomultiplier; and that optical density bears an inverse logarithmic relation to the amount of light incident on the photomultiplier tube.

Certain other features and advantages of the invention may be appreciated when these features are contrasted with prior art systems of optical densitometry and elements forming parts of such systems.

For example, prior known densitometer systems adapted to measure optical density have received the output of a photomultiplier and applied this output, with or without amplification, to an analog or deflection type voltmeter for reading optical density. However, the amplitude of the signal emanating from the photomultiplier or phototube bears a direct relation to the intensity of the light falling on the phototube, while units of optical density are logarithmic, rather than directly proportional, and such units bear an inverse rather than a direct proportion to incident light. Therefore, in the past, means have been required to compensate for these conditions in order to obtain proper readings on an instrument. Accordingly, some voltmeters used in such systems in the past have had modified pole faces, whereby the deflection of the needle is proportional to the logarithm of the strength of the applied signal rather than to the strength of the signal. On the other hand, linear type analog meters can be and have been used with the scale calibrated in density but severe crowding of the higher density values occurs, and such meters therefore lack legibility.

Certain systems such as this have also in some cases required so-called range switching, that is, they have required the meter which is to be read to be preset to a particular range in which the optical density of the specimen is expected to fall, since proper readings cannot otherwise be obtained as a practical matter.

Although prior art systems designed as set forth are operative to provide reasonably accurate measurements of optical density, the inherent construction of the meter and other elements of the circuit are such that a densitometer having this type of meter is inherently not adaptable to measure other characteristics or provide other modes of operation. That is, such a densitometer system cannot readily be made to provide readings of percentage dot area or percentage of light transmission or reflection. Accordingly, densitometers as set forth above are principally limited to use where optical density only is sought to be measured.

Referring now to another field in which optical densitometry finds considerable use, namely, the printing industry, it is well known in this field that the production of high quality half tone images depends importantly on obtaining accurate readings of the percent dot area of the specimen from which the final printing is ultimately made. Densitometers used for this purpose are customarily calibrated in terms of the percent dot area of the specimen, since this criterion governs the tone of the finished print as seen by the reader, and accordingly, must be observed accurately. Densitometers used for this purpose in the past have proven satisfactory, however, the units are such that the same densitometers cannot normally be used without alteration to produce readings in terms of light transmission or optical density.

Densitometers known to the prior art are also commonly used to measure the percent of light transmitted through non-opaque materials, or reflected from other specimens. For example, in colorimetry, it is desired to measure the amount of light transmitted through a specimen in relation to the light transmitted through a standard solution or cell, and to perform calculations on this basis. In such a case, the transmitted light reading is in direct proportion to the amount of light falling on the phototube or photomultiplier. Circuits adapted to produce readings of this type are not customarily adapted to provide readings indicative of optical density or percent dot area of a specimen. Therefore, known densitometers used in making light transmission readings have not characteristically been capable of providing such other readings without modification of some sort.

In those cases where known instruments were capable of being adapted for these various purposes, the manner of achieving changeover or modification was inconvenient or expensive.

In view of the shortcomings of prior art densitometry systems and components thereof, it is an object of the present invention to provide an improved densitometry system including an electrical system having a number of advantages not possessed by prior art systems.

Another object of the invention is the provision of an electrical system for use in optical densitometry which is characterized by flexibility and simplicity of operation.

A still further object of the invention is the provision of an electrical system having plural separately operable but interrelated circuits, all of which may be used with existing photometers and readout meters and the like.

Another object of the invention is to provide an electrical system having at least one circuit which is capable of being interposed between a photometer and a readout meter, and adapted to present a readout signal to the voltmeter or the like which bears a predetermined relation to the intensity of the signal received by the photometer, as well as at least one other circuit adapted to be associated with the photometer so as to alter the relation between the signal received by the photometer and the signal emitted therefrom.

Another object of the present invention is to provide a signal converting circuit which can conveniently be used with conventional analog or digital voltmeters and which will indicate a large range of optical density readings without the necessity of so-called range switching.

A still further object of the present invention is to provide an electrical system having at least one circuit which produces an output signal which is inversely proportional to the logarithm of the intensity of light incident upon the photometer so that a digital voltmeter receiving the output signal will provide a direct digital readout of optical density.

Another object is to provide for use in optical densitometry, an electrical system having at least one circuit which will produce an output signal having a magnitude which bears a direct, linear relation to the magnitude of the input signal received from a photometer so that a direct reading of light transmission or reflection may be had by reference to a readable instrument having an indicator which is movable in proportion to the output signal applied thereto.

Another object is the provision of an electrical system for such use which includes at least one circuit which will provide for a direct reading of the percentage dot area of a specimen being analyzed by reason of providing for a meter an output signal having a strength which is inversely proportional to the strength of an input signal received from an associated photometer.

A further object is to provide a densitometry system having plural electrical circuits, each providing a different mode of internal operation and being adapted to sense a different optical property of a sample, and all providing an output signal which may be supplied directly to a single, direct-reading linear response readout instrument for accurate reading of the property selected by the operator for measurement.

A further object is the provision of a multi-circuit electrical system for use in optical densitometry which includes means for receiving a signal from an associated photometer and, depending upon the circuit selected, for amplifying such signal or an auxiliary or related function of said signal and for supplying the resultant or output signal to a readable measuring instrument.

Another object is to provide a system of the above set forth type which further includes means for altering the magnitude of a photometer signal which is to be received by one portion of the circuit and which would otherwise have a magnitude bearing a direct linear relation to the intensity of the light incident on the photometer so that the photometer output will bear a non-linear relation to the intensity of the received light and so the circuit may readily provide direct readings of a measured function which bears a non-linear relation to the intensity of the incident light.

Another object is to provide an electrical system having plural circuits which may be selected for independent use merely by positioning an associated circuit selector.

A further object is to provide an electrical system providing plural, selectable responses and characterized by the common use of certain elements and by simplicity in operation and use.

Another object is to provide an electrical system for use in optical densitometry which includes means for receiving a signal bearing a predetermined relation to the intensity of light passing through or reflecting from a specimen, for summing or combining the intensity of the received signal thus obtained with a reference signal of predetermined strength and amplifying the resultant signal so that said signal may be applied to an instrument for measuring the per cent dot area of a specimen being analyzed.

Another object is to provide an electrical system having an output which may be equally conveniently used with deflection type or digital reading type volt meters or like measuring instruments to provide readings of selected optical characteristics of specimens.

The present invention accomplishes these and other objects and advantages, including those inherent therein, by providing an electrical system having a plurality of circuits including circuits having means for receiving an input electrical signal indicative of an optical characteristic of a specimen being analyzed, means for converting the received signal to a signal indicative of the property being measured, and means for amplifying the indicative signal so that, as amplified, it may be supplied to an instrument characterized by linear response to a characteristic of an applied signal.

The invention also achieves other of its objects and advantages by providing plural selectable circuits adapted to provide output signals which are, respectively, substantially inversely proportional to the intensity of the incident light, directly proportional to the intensity of the incident light, and inversely proportional to the logarithm of the intensity of the incident light so that percent dot area, percent light transmission and optical density, respectively, may be measured on the same instrument.

The manner in which the electrical system of the present invention achieves its objects, including the above set forth objects, and other objects and advantages inherent therein, will become more apparent when reference is made to the following detailed description of a preferred embodiment of the invention and to the drawings, in which like reference numerals indicate corresponding parts throughout.

BRIEF DESCRIPTION OF THE DRAWINGS

FIG. 1 is a block diagram of a photometry system incorporating the electrical system of the present invention;

FIG. 2 is a schematic diagram of a preferred form of electrical system of the present invention, showing several of the circuits thereof in detail;

FIG. 3 is a schematic drawing of one of the circuits of the electrical system of the invention, shown apart from its association with the other circuits forming a part of one preferred embodiment of the invention.

FIG. 4 is a schematic drawing of another of the circuits of the electrical system of the invention, shown apart from its association with the other circuits forming a part of one preferred embodiment of the invention;

FIG. 5 is a schematic drawing of still another of the circuits of the electrical system of the invention, shown apart from its association with the other circuits forming a part of one preferred embodiment of the invention.

DESCRIPTION OF THE PREFERRED EMBODIMENTS OF THE INVENTION

Before referring in detail to various features of the preferred embodiments of the invention, it will be understood that the present invention may be used in optical densitometry as well as in other fields, and that, in optical densitometry and other fields, particularly wherein light is the form of radiant energy measured, the light or other energy as measured may be that which has passed through a specimen or that which is reflected from a specimen. In other words, a number of optical characteristics are measured by one such technique and others are measured by other techniques, according to custom, convenience and other factors. Accordingly, whether the incident light or other energy creating the signal which is acted upon by the various circuits forming a part of the electrical system of the invention is reflected from or transmitted through a specimen is unimportant for purposes of the present invention, it being understood that conventional practices will dictate the method used.

Likewise, it is understood that in referring to polarities and the like, a preferred embodiment is described wherein, for simplicity, certain arbitrary polarities have been chosen. Thus, in a summing network, signals of opposite polarities in varying strengths will conveniently create a signal of reduced strength having an intensity opposite to the variable intensity of the signal measured and may thus conveniently serve to bring about negative amplification, while summing of signals of the same polarity or using the varying or unknown signal directly to control amplification will conveniently provide direct measurement of the signal sensed. All of the above are known to those skilled in the art, and accordingly, the invention is not intended to be restricted to the use of any particular polarities or signal characteristics.

It will also be understood that, as used herein, the expressions "input" or "input signal" and "output" or "output signal" normally refer respectively to the signal received by the electrical system of the invention from the photometer or detector, and the signal produced by the system and supplied to the readout means, such as the voltmeter, inasmuch as an input signal to one circuit is the output signal from an adjacent related circuit, etc.

Referring now to the drawings in greater detail, FIG. 1 shows an electrical system 10 used in optical densitometry and disposed between means in the form of a photometer 12 for picking up an input signal and means in the form of an instrument 14 for displaying a reading of signal strength or the like. Typically, instrument 14 is a digital voltmeter; however, as shown in phantom lines at 16, the instrument 14 may be an analog voltmeter of the deflection type and having a linear scale which reads increasing values from left to right.

As is also shown in FIG. 1, a light source 18 is provided for furnishing incident light which is then transmitted through or reflected from a specimen 20, which for example may be a chemical solution, a film negative or other object. The photometer 12 detects or picks up the light transmitted through or reflected from the specimen, and emits an input signal which is fed to the electrical system 10. The voltmeter or other instrument 14 will display a reading depending upon the amount of light sensed by the photometer 12 and the selected mode of operation of the electrical system 10. The mode of operation is determined by the position of a multiple position circuit selecting switch 22 which typically provides three different modes of operation.

With the switch 22 in the first position, a selected circuit will supply an output signal to the instrument 14 which is indicative of the darkness or percent dot area on the specimen 20. With the switch 22 in the second position, the selected circuit will supply the instrument 14 with an output signal having an intensity which is proportional to the percent of light transmitted through the specimen 20. With the switch 22 in the third position the circuit thus selected will supply to the instrument 14 an output signal indicative of the optical density of the specimen 20.

Since the photometer 12 is typically a phototube adapted to furnish an amplified or preamplified signal, it receives an operating voltage from the system 10 from a lead 26, while the output signal from the photometer 12 is applied to the system 10 through lead 28. The instrument 14 receives an output signal from one circuit of the system 10 through leads 30 and 32.

The details of the system 10 including the plurality of individual circuits are generally indicated at 34 in FIG. 2, wherein a composite schematic drawing 34 is shown which includes a plurality of sets of switch contacts, with one contact in each set being designated 1, another contact in each set being designated 2 and the other contact in each set being designated 3. It will thus be understood that, with the selector switch 22 in one of the three numbered positions, one each of the correspondingly numbered switch contacts 1, 2, or 3 will establish an operative connection with a corresponding terminal to form a circuit having a particular mode of operation. Thus, certain elements of the system 10 will be inoperative during the time a particular circuit is energized, while, on the other hand, certain elements are commonly made use of, and these include a direct current power supply 36, and an operational amplifier diagrammatically shown at 38. Since an important object of the invention is to present to the instrument 14 a signal which is of appropriate strength and polarity to actuate a single measuring instrument, the voltmeter or other instrument 14 is always connected across leads 30, 32. Furthermore, the movable contact portion of the switch 22 is commonly used and is movable between selected positions used for actuating different circuits. Since a preferred form of the invention utilizes a six pole switch arranged for common or ganged operation, each movable contact or pole is designated in FIG. 2 by an identifying letter, and these poles are identified as 22a, 22b, 22c, 22d, 22e and 22f, respectively.

Since FIG. 2 is a composite schematic drawing showing three separate but related circuits forming the electrical system of the invention, reference may be had thereto for visualizing one preferred embodiment of the system; however, since the system can be used in three modes of operation, with certain aspects of the operation of each being similar and certain other aspects being different, the circuits are separately illustrated in FIGS. 3-5 for purposes of explanation of the functions thereof. A detailed explanation of the components of each system and the characteristics for functioning thereof will now be described in greater detail.

Referring now to FIG. 3, the circuit 40 adapted to provide a direct reading of the percent dot area of a specimen is shown apart from its association with the remainder of the circuits contained in the electrical system 10. FIG. 3 shows that a signal emanating from the photometer 12 is supplied through lead 28 and input resistor 42 to the negative input terminal 44 of the operational amplifier 38. A line 46 also extends from this input terminal 44 to a network 48 of resistors 50, 52, 54. The terminal 56 of the network 48 receives negative polarity DC from an associated power supply 58 through lead 60. Accordingly, proper selection and adjustment of the resistors 50, 52, 54 forming network 48 will determine the DC voltage supplied to the negative input 44 of the operational amplifier 38.

The power supply 58 also includes a positive voltage common line or bus 62 having a terminal 64 to which is supplied a fixed positive voltage, while an extension 66 of negative voltage supply line 60 supplies negative voltage at a suitable negative terminal 68 of the operational amplifier 38. In this embodiment, both positive and negative bias of a fixed value are maintained on the amplifier 38. Since the circuit 40 is adapted for use in the percent dot area mode of operation, the amplifier output line 70 includes terminals 72, 73, to which are connected feedback lines 74, 76 each having feedback resistors 78, 80 and terminating at the negative input terminal 44 of the amplifier 38. The voltage appearing at terminal 72 will be applied through line 82, to a terminal 84 of the voltmeter or like instrument 14, while a lead 86 connects the other terminal 88 of the meter 14 to a ground potential line or terminal 90. In the form of circuit illustrated in FIG. 3, it will be understood that switch pole 22a completes the circuit in line 28, that pole 22b completes the circuit in line 46, that pole 22c completes the circuit in line 70, and that pole 22d completes the circuit between terminal 92 of the positive voltage power supply line 62 and the lead 26 which supplies the same positive voltage to the photometer 12. Likewise, pole 22e serves as a contact between the signal output line 82 and the voltmeter terminal 84, and pole 22f connects a ground potential point 90 with the other terminal 88 of the voltmeter 14.

In the use of this circuit, it may be assumed that a positive voltage signal, if emitted from the photometer 12, would, after passing through resistor 42, appear at terminal 44 and oppose any negative voltage supplied thereto. However, terminal 44 is already receiving a predetermined full negative bias from the power supply 58, and accordingly, maximum strength of the output signal will appear in lines 70 and 82 if no positive voltage appears at terminal 44 to oppose the negative potential in line 46. Assuming a specimen, such as a photographic half-tone specimen, to be virtually opaque or totally or almost totally absorptive of incident light, little or no light will fall on photometer 12 and the positive voltage present in line 28 will be zero or near zero. On the other hand, a specimen having a small percent dot area is highly reflective or transmissive of light, and accordingly, light reflected therefrom or passing therethrough from source 18 would fall on photometer 12 with a high intensity, causing high output in the input line 28. Since lines 62 and 26 serve to furnish a constant, fixed bias on phototube 12, the output response thereof will be substantially linear, and therefore, the DC positive voltage appearing in line 28 will always be in direct, linear relation to the light incident on the photometer 12. Since positive voltage applied to terminal 44 opposes and modulates the negative voltage supplied thereto by line 46, apparent amplification within the operational amplifier 38 and signal strength in line 70 and 82 will be in negative or inverse relation to the positive voltage in line 28. Accordingly, the instrument 14 will provide a high numerical value reading when opposition to negative voltage at terminal 44 is at a minimum, and accordingly, the darkest, most opaque or least reflective specimens will cause the highest reading on the instrument 14, while specimens transmitting or reflecting large amounts of light will create strong signals at terminal 44 opposing the preset negative bias appearing in line 46, and cause a low instrument reading which is characteristic of a low percentage of black or dot area in the portion of the specimen being analyzed.

As is well known in the art, the values of resistors 78, 80 appearing in lines 74, 76 are selected in relation to the value of resistor 42 so that there is the desired fullback and consequent high gain which is characteristic of an operational amplifier of the type schematically illustrated at 38. Accordingly, positioning the switch 22 in numbered position 1 will result in an operational mode wherein percent dot area may be directly read on instrument 14, with maximum dot area or darkness causing the highest strength signal to appear at 84 and minimum dot area or lightness will cause the minimum strength signal to appear at terminal 84 and thus cause the instrument 14 to display the smallest reading.

Referring now to FIG. 4, a circuit generally designated 94 is shown for indicating the percentage of light transmission through a specimen 20 on the same voltmeter or like instrument 14 used in the percent dot area circuit 40. The circuit 94 is similar in many respects to the percent dot area circuit 40, except that it is arranged to respond oppositely to a given signal, since the quantity measured by this circuit, namely reflected or transmitted light, is the inverse of the quantity measured by the circuit of FIG. 3, that is, the percent dot area of a specimen.

Accordingly, the power supply 58 also includes the negative voltage lead 60 for supplying negative voltage to terminal 68 of the operational amplifier 38, and the positive voltage line 62 for supplying the positive voltage to terminal 64, and to the terminal 92 to which lead 26 is connected for supplying positive bias to the photometer 12. The amplified signal output line 70 also includes the terminals 72, 73 and the feedback lines 74, 76 which contain the resistors 78, 80 and which lead to the negative input terminal 44 of the operational amplifier 38. Line 46 in circuit 94 also terminates in a resistor network 96, which is comprised of resistors 98, 100, and which is grounded as at terminal 102.

Line 28, in the embodiment of FIG. 4, is adapted to supply any positive voltage signal therein through resistor 104 to a junction 106 which is common to the positive input terminal 108 of the operational amplifier 38 and the grounded voltage dividing resistor 110. Accordingly, the voltage appearing at terminal 106 will be divided between terminal 108 and resistor 110; nevertheless, a predetermined portion of the positive voltage in line 28 will always be supplied to the input terminal 108.

FIG. 4 also shows that the output of the operational amplifier 38 is fed through lines 70 and 82 to the terminal 84 of the instrument, the opposite terminal 88 thereof being grounded as at 90 through line 86. With the switch 22 (FIG. 1) in position 2 (FIG. 2), pole 22a will complete the circuit in line 28, pole 22b the circuit in line 46, pole 22c the circuit in the lines 70 and 82, pole 22d the circuit in the line extending between junction 92 and line 26, pole 22e the circuit from line 82 to terminal 84, and pole 22f the circuit from line 86 to ground 90.

In the use of the circuit 94 for determining percentage of light transmitted or reflected, a positive voltage in proportion to the intensity of light falling photometer 12 will appear at line 28 and will be fed through resistors 104 to terminal 108, with a portion thereof being grounded through resistors 110. There is no summing network or constant opposition to this signal, and accordingly, the strength thereof will characterize the output signal appearing in lines 70 and 82, it being understood that the feedback lines 74, 76 operate in this circuit in a manner similar to their manner of operation in the circuit of FIG. 3. That is, the amplifier is a high gain unit by reason of the output feedback to the negative input terminal 44. The voltage appearing at terminal 44 under predetermined conditions of signal strength in line 70 may be varied by varying the values of the resistors 98, 100 in the resistor network 96.

In the use of the circuit illustrated in FIG. 4, the signal appearing in line 28 is greatly amplified by the operational amplifier 38 which is characterized by the preset bias furnished by power supply 58 and by the feedback loops 74, 76. The greater the intensity of the positive signal at 28, the higher voltage will appear at 84 and the higher will be the numerical reading of the instrument 14. Accordingly, this circuit is characterized by direct or positive amplification characteristics and is ideally suited for measuring quantities such as percentage of light transmission or reflection from a specimen. Thus, one position 2 is selected, connections to the instrument 14 are made, positive bias is supplied to the photometer 12, the photometer output is supplied to the positive input terminal 108 of the operational amplifier 38, the desired resistor network is energized, and feedback for the operational amplifier 38 is provided through feedback resistors 78 and 80.

Referring now to FIG. 5, a third circuit 112 is shown which is adapted to display on instrument 14 an indication of the optical density of the specimen 20 through which light is transmitted or from which it is reflected. As is well known in the art, the customarily used units of optical density range from 0 to 4 following a logarithmic progression, so that a specimen having a zero optical density will pass 100 percent of incident light, a specimen having a density of about 0.316 will transmit about one-half of the incident light, a specimen having a density of 1.0 transmit 10 percent of incident light, with optical densities of 2.0, 3.0, 4.0, respectively characterizing specimens which pass 1%, 0.1%, and 0.01% of incident light, respectively. Accordingly, four so-called decades or orders of ten are present, with each decade encompassing a range of readings having 10 times the density of the preceding decade. In view of the fact that optical density units are so defined, in a proper circuit for providing readings of optical density which may be read directly on a voltmeter or other instrument which responds by an indicator movement which is in direct linear proportion to the strength of the applied signal, means must be provided for causing a non-linear response between the potential signal input and the signal output.

In the preferred form of circuit, this accomplished at least in part by feeding back to the photometer a signal related to the strength of the signal received by the amplifier by a photometer amplifier feedback network which will be described herein.

Since it is well known that the gain of the phototube or photometer is affected by the voltage applied to the photometer or to an amplifier associated therewith, means are provided for varying this voltage in response to the strength of the signal received by the operational amplifier so that a non-linear, or more specifically, a logarithmic amplification effect takes place. Furthermore, in the preferred form, the invention provides means for insuring a relatively accurate response by reason of one or more so-called linearizing or warping diode circuits provided for purposes of insuring that the photometer response is as close to true logarithmic form as possible.

In general terms, ordinarily a photometer consists of one or more photocells which generate current proportional to the intensity of the input signal, or at constant current value, a voltage proportional to the intensity of such incident light. Although this signal is extremely weak, it can accurately form the basis for an accurate instrument. Therefore, it is customary for photoresponsive circuits to include or have associated therewith means for amplifying the signal generated in response to incident light so that sufficient voltage or current may be provided to form a useful function. For purposes of the present invention, the photocell, which may be considered a detector, and any suitable form of amplifier therefor together comprise the photometer 12. According to known principles, the ultimate output of the photometer 12 in relation to the input may be varied by altering the bias voltage applied thereto, or by altering the gain of the amplifier portion of the photometer. When the circuits shown in FIGS. 3 and 4 are selected for use, a constant bias is supplied through line 26 to the photometer 12, for purposes respectively of reading percent dot area of a specimen and percent light transmission through a specimen, whereas, in the case of the circuit 112 shown in FIG. 5, a transistor amplifier system 114 and a diode warping system 116 are provided for association with line 26, and accordingly, the line 26 is fed by the positive output of the power supply 58, as this output is modified by the effect of the transistor amplifier system 114 and the diode warping system 116, as will now be described.

As in the previously described circuits, the circuit 112 includes the photometer 12, a photometer output line 28 disposed between the photometer 12 and the input resistor 42, one end of which is attached to the negative input terminal 44 of the operational amplifier 38. The lower voltage or output end of the resistor 42 is also connected to the line 46 which, as in the other embodiments, is connected through the pole 22b to a resistor network 118 comprised of resistors 120, 122 and 124. Line 60 supplies a preset negative bias to line 46; one end of the resistor 122 which determines this voltage is grounded as at 126. As in the other embodiments, line 60 supplies negative bias to the operational amplifier 38 and line 62 supplies positive voltage thereto. In this embodiment, operational amplifier feedback line 74 including feedback resistor 78 extends between the terminal 72 and the negative input amplifier terminal 44 in a manner characteristic of known operational amplifiers. A positive terminal 108 of the amplifier 38 is grounded through resistor 110 for use of the system 10 in this mode.

Referring now to the output line 70, it will be noted that the voltage appearing therein will be divided at terminal 128 between a dropping resistor network 130 and a base terminal 132 of the transistor amplifier 114. A voltage dividing resistor 134 is disposed between the base terminal 132 and a point of ground potential. Positive voltage from line 62 will accordingly be furnished to the photometer supply line 26 through the transistor amplifier 114 in proportion to the strength of the signal furnished to the base 132. Accordingly, the emitter-collector circuit portion of transistor amplifier circuit 114 actually forms a portion of the photometer bias supply line 26 and is able to control voltage therein in response to the magnitude of the signal emitted from operational amplifier and present in line 70.

Referring now to the resistor network 130, it will be noted that resistor 136 is disposed between terminal 128 and a tap 138 to which are connected a second resistor 140 and a line 142 which is connected to one terminal of each of the warping diodes 144, 146. Slope potentiometers 148, 150 extend between the other terminals of the diodes 144, 146 and the points 152, 154 at which they are tapped into breakpoint potentiometers 156, 158, which receive positive bias direct branch 62a of the portion voltage supply line 62. Accordingly, voltage conditions occurring from time to time in the operation of the circuit determine whether neither or one, or both of diodes 144, 146 will be conductive and therefore form with resistor 140 parallel paths of resistance for signals appearing at the tap 138.

In the embodiment of FIG. 5, it will be noted that line 82 attached to terminal 84 of voltmeter or other instrument 14 is connected at point 160 of adjustable resistor or potentiometer 162, while line 86, which is connected to the other voltmeter terminal 88 is suitably tapped into resistor 162, as at point 64. Negative voltage in line 60, which includes resistor 166, is divided at point 168 between the resistor 162 and a portion of resistor 172 to which a ground connection 174 is affixed.

In a manner similar to their use in the other circuits, pole 22a completes the circuit in line 28, pole 22b completes the current path in line 46, pole 22c completes the current path of line 70, pole 22d completes the current path in line 26, and poles 22e and 22f complete the circuits respectively in lines 82 and 86. Each connection or contact made by a pole 22a, 22b, etc., is also labelled with the number 3 in FIG. 5 to indicate that the circuit 114 is in operation only when the switch 22 (FIG. 1) is manipulated so as to engage the pole 22a, 22b, etc. with the stationery contacts of the third or optical density reading circuit.

Referring now to the operation of the circuit shown in FIG. 5, the light received by the photometer 12 by transmission through a specimen 20 is amplified within the photometer 12 in proportion to the voltage supplied through line 26 to the photometer 12; however, this voltage is modulated or diminished by the provision of the transistor amplifier 114, the gain of which is determined by the output signal present in line 70 and supplied to the base of the transistor at terminal 132. Inasmuch as units of optical density bear an iverse numerical relation as well as a logarithmic relation to the intensity of the transmitted light, the input to the operational amplifier 38 consists of the algebraic sum of voltages or signals appearing in lines 28 and 46. In other words, if no light is received by the photometer 12, and no signal appears in line 28, the full negative voltage appearing in line 46 will be supplied to the terminal 44, and the strongest signal will be present in lines 70 and 82, giving the greatest reading in the instrument 14. As the intensity of the light falling on the light pickup or photometer 12 is increased, the strength of the input signal in terminal 44 is decreased by reason of the application of opposite voltage in line 28. Accordingly, a lower strength signal will appear in line 70, and the gain of the amplifier 114 will be reduced, lowering the voltage level in line 26 and thereby tending to decrease the sensitivity of the photometer 12. In this connection, it will be understood that, in view of the logarithmic proportion referred to above, the photometer must be most sensitive in the high value end of the optical density scale, and least sensitive in the low end thereof, since one-fourth of the total scale, that is, the portion of the scale between 3.0 and 4.0, encompass light values ranging only between 0.1 percent and 0.01 percent of the total possible transmitted light, whereas, on the other end of the scale, light values ranging between 100 percent transmission and 10 percent transmission are encompassed in the single "decade" of values between 0 and 1.

Referring again to the operation of circuit 112, when a high light level falls on the phototube or photometer 12, not only is the output of the operational amplifier reduced by reason of the opposed voltage appearing in line 28, but also the amplifier 114 is biased to a relatively non-conductive or low amplification state. Consequently, the sensitivity of the phototube or photometer 12 to relatively large changes in amounts of incident light is greatly diminished, thereby bringing about the logarithmic response characteristics of the circuit. As in the case in the circuit illustrated in FIG. 3, feedback of the signal emitted from the operational amplifier 38 to the negative input terminal of operational amplifier 38 is accomplished by way of line 74 containing feedback resistor 78. Referring now to the provision of the resistors 166 and 172, to which the output from the instrument 14 is supplied at point 168, this portion of the circuit is referred to as a zero offset control. This portion of the circuit, which is an important feature of the invention, is provided so that the instrument 14 may read 0.00 density, that is, where a zero strength signal is present in line 82, even though a certain strength DC signal appears in the output line 70. This permits application of at least minimum D.C. voltage to the photometer 12 through line 26. In other words, the photometer 12 must have a certain bias to be operative, even though its gain is at a minimum.

Referring now to the warping diodes 144, 146 and the associated potentiometers 148, 150, these have been referred to as slope potentiometers, whereas potentiometers 152, 154 have been referred to as so-called breakpoint potentiometers. The reason for providing these potentiometers will now be discussed.

Since the response of the instrument 14 is linear in respect to the intensity of the signal received by it, as previously pointed out, it is necessary that the signal fed to the instrument be linear in character. However, in practice, the characteristic response of a photomultiplier varies somewhat from true logarithmic form, even where there is careful control of the variation of the voltage fed to the photomultiplier for amplifying the signal.

Accordingly, under such conditions, there is a need for so-called warping circuits or the like. That is, the response curve of the system must be "warped" to achieve an accurate logarithmic response rather than merely a non-linear response, so that the system as a whole will have a high degree of accuracy.

This is achieved by the provision of the diodes 144, 146, which above a preset level, will conduct and effectively place potentiometers 148, 150 in parallel with resistors 140, 162. It is because the slope of the response curve of the system may be altered by adding parallel resistors, that the expression slope potentiometers is used in making reference to the potiometers 148, 150. The expression breakpoint potentiometers is applied to the units 152, 154 which act by back biasing the diodes 144, 146 to prevent conduction therethrough until the voltage in the circuit reaches a predetermined level. In this manner, since the voltage at point 138 may be varied by the warping diodes portion of the circuit, some additional control of the base voltage of the transistor amplifier 114 is accomplished. Therefore, the signal in line 70 is affected by conditions in the operational amplifier 38 and is "warped" by the action of the diodes 144, 146.

Referring now to certain general characteristics of the system, although any appropriate values may be used, the operational amplifier circuit 38 may be biased by the application thereto of 18 volts DC, both positive and negative polarity. The ratio of resistance of the feedback resistor 78 to the resistance of the input resistor of the amplifier 38 is preferably of the order of 6 or 7 to 1. The instrument 14 is preferably a digital voltmeter, although an analog type meter may be used.

As pointed out above, the illustrated embodiment of the invention is one affording maximum simplicity and reliability, together with the versatility afforded by easy selection of different modes of operation. It will be clear that these different modes may be selected without adjustment or alteration of the system in any way. Nevertheless, each individual circuit is sufficiently accurate and reliable to enable the system to be used continuously or almost continuously in one mode of operation only. Thus, aside from the novelty of each individual circuit, novelty also resides in the arrangement of the apparatus so that certain elements are common to all the circuits. Another feature of the invention is the characteristic use of direct current throughout, thereby eliminating the need for rectifiers, oscillators, and other circuits characterized by lack of stability and other inherent drawbacks.

Referring now to other features and advantages of the invention, it will be noted that, by reason of the operational principle whereby the ultimate instrument reading results either from the difference between two opposing different polarity voltages, or from the application of a predetermined voltage to the negative input terminal of the operational amplifier 38, and by reason of the adjustability of resistor networks 48, 96, or 118 which control this negative operational amplifier input voltage, a reference point or "zero" may be predetermined so as to fall on an arbitrary zero indicative of the optical value of a reference standard against which the values of other specimens may be compared. Thus, the system 10 may readily be used in any one of its three modes as a so-called null comparator.

In such an application, the instrument 14 would preferably be an analog meter having a zero reading in the middle with increasing positive values lying to one side thereof and negative values to the other side thereof. In use, the offset or negative voltage may be adjusted by adjusting the resistor network 48, 96, or 118 so as to display a zero reading when a known standard is being read. Thereafter, a number of specimens can be analyzed and their deviation from the arbitrarily preset zero can be determined. Such an application is common in quality control work, for example, wherein the optical value in question is determined in relation to the preset standard, and specimens falling outside a permitted range of variation therefrom are rejected. This operation is most conveniently carried out with an analog meter having the type of movement indicated, although it may obviously be carried out with a digital voltmeter having a zero and plus or minus values, or such a meter using one number thereof as the arbitrary "zero." The use of the system in this mode is indicated where it is desired or required to know only by deviation from a known standard of the optical characteristic being measured. It is also apparent that the variable or predeterminable negative input voltage system permits such comparative readings to be made regardless of whether optical density, light transmission, reflectance, or percent dot area are being measured.

Referring now to another feature of the invention, it will be noted that, by reason of amplifying the resultant or difference signal in some modes of operations and the direct signal in other modes, the movement of the meter indicator will always be in the same direction for increasing values, that is, a movement mode wherein the zero reading is at the left and the higher values are at the right. Thus, scales may always be read in the same direction and the likelihood of reading the wrong scale or of faulty interpolation is diminished.

It will be apparent to those skilled in the art, however, that certain modifications and variations may be made to the form of electrical system illustrated without departing from the spirit of the invention, and accordingly, the scope of the invention is not intended to be limited to the form of apparatus disclosed.

It will thus be seen that the present invention provides an electrical system for use in optical densitometry having a number of advantages and characteristics including those herein pointed out and others which are inherent in the invention.

I claim:

1. An electrical system for use in optical densitometry, said system having means for detecting incident light transmitted through or reflected from a specimen, and an electrical indicator for indicating the magnitude of said incident light, means for converting said incident light to an electrical input signal of a given polarity, a summing network adapted to produce a resultant signal for amplification, said network including means for combining said input signal and a signal having an opposite polarity and a fixed intensity greater than that of said input signal, means for amplifying said resultant signal, and means for feeding said amplified resultant signal to said electrical indicator for display thereon of a reading which is inversely proportional to the intensity of said incident light.

2. An electrical system for use in optical densitometry and adapted to provide, on a single associated instrument, readings indicative of plural optical characteristics of specimens exposed to light and having light transmitted through or reflected from said specimens for detection and measurement, said system including a photometer for detecting incident light and for convering said incident light to an input electrical signal, the magnitude of said input electrical signal emitted from said photometer being proportional to both the intensity of said incident light and to a biasing potential applied to said photometer, a first amplifier having a first input terminal for receiving signals of a first polarity and a second input terminal for receiving signals of a second and opposite polarity, and providing at an output terminal amplified signals of said second polarity; means for controlling said photometer biasing potential, a source of unidirectional current of said first polarity, plural position selector means adapted to provide selected conductive paths through the elements of said system, said selector means being adapted, in a first position thereof, to provide an operative connection between said photometer and said second amplifier terminal for feeding said input signal to said second terminal and between the output of said amplifier and said instrument, whereby said instrument will display a reading directly proportional to the intensity of incident light received by said photometer, said selector means being adapted, in a second position thereof, to provide an operative connection between said photometer and said first amplifier terminal, between said means for supplying said unidirectional current and said first terminal and between said amplifier output and said instrument, whereby said instrument will display a reading which is inversely proportional to the intensity of light incident upon said photometer, and said selector means being adapted, in a third position thereof, to provide an operative connection between said photometer and said first amplifier terminal, between said means for supplying said unidirectional current and said first terminal, between said amplifier output and said instrument, and between said amplifier output and said means for controlling said photometer biasing potential, whereby said instrument will provide a reading which is inversely proportional to the logarithm of the intensity of the light incident upon said photometer.

3. A system as defined in claim 2 which further includes an impedance connected between said output terminal and said first input terminal, said impedance forming in conjunction with the impedance of said unidirectional current source a feedback loop for said amplifier.

4. An optical densitometry system including an electrical circuit adapted to produce for application to an associated electrical indicating instrument of the type directly responsive to the magnitude of an applied signal an output signal having a magnitude which is substantially inversely proportional to the magnitude of an input signal received by a portion of said system from an associated photometer, said system including an amplifier having an input terminal for receiving a signal of predetermined polarity, and an output terminal, and means for feeding the amplified output signal from said output terminal of said amplifier to said electrical indicating instrument, and means for feeding a signal of said predetermined polarity and of a predeterminable, variable magnitude to said input terminal, and means adapted to receive from said associated photometer an input signal of an opposite polarity to said predetermined polarity and of a magnitude which is directly proportional to the intensity of the incident light on said associated photometer, said magnitude being lesser than said predeterminable, variable magnitude, whereby said input terminal will receive a signal having a magnitude equal to the difference between said predeterminable, variable magnitude and said lesser magnitude, and whereby said output signal from said amplifier will bear an inversely proportional relation to the intensity of said input signal.

5. An optical densitometer of the type providing an output indication inversely proportional to the intensity of an incident light, comprising:

means comprising a photometer for producing an output signal of predetermined polarity and of an amplitude directly related up to a predetermined maximum level to the intensity of said incident light;

an amplifier having an input terminal and an output terminal and adapted to provide polarity inversion between said terminals;

means for applying said output signal from said photometer to said amplifier input terminal;

a source of unidirectional current of opposite polarity to the predetermined polarity of said photometer output signal;

means for applying said unidirectional current to said amplifier input terminal at an absolute voltage level greater than said predetermined maximum output voltage level of said photometer to develop on said output terminal an electrical signal inversely proportional to the output signal level of said photometer;

an output indicator directly responsive to an applied electrical signal;

and means for applying the output signal from said amplifier to said output indicator to provide an output indication inversely proportional to the intensity of said incident light.

6. An optical densitometer as described in claim 5, wherein said means for applying said unidirectional current to said input terminal comprise an adjustable voltage divider.

7. An optical densitometer as described in claim 6, wherein said densitometer further comprises an impedance element coupled between the input and output terminals of said amplifier, said element providing in conjunction with said voltage divider a feedback loop for determining the effective gain of said amplifier.

8. An optical densitometer for producing an output indication inversely proportional to the logarithm of the intensity of incident light comprising:

a photometer for detecting said incident light and for producing an output electrical signal of a given polarity and of a magnitude proportional to both the intensity of said incident light and to the magnitude of an applied bias;

a summing network for combining said output electrical signal from said photometer with a second signal of opposite polarity and of a fixed magnitude greater than that of said output signal to produce a resultant signal;

an amplifier having input and output terminals;

means for applying said resultant signal to said input terminal;

an output indicator responsive to an applied electrical signal;

means for applying a bias proportional to the amplified resultant signal on said amplifier output terminal to said photometer to achieve a logarithmic output characteristic therefrom;

and means for applying the amplified resultant signal from said amplifier output terminal to said indicating instrument to provide an output indication inversely proportional to the logarithm of the intensity of said incident light.

* * * * *